United States Patent [19]

Chamberlain et al.

[11] Patent Number: 4,600,947
[45] Date of Patent: Jul. 15, 1986

[54] TELEVISION SOUND MUTE CIRCUIT

[75] Inventors: William Chamberlain, Lombard; John C. Weigand, Oak Park, both of Ill.

[73] Assignee: Zenith Electronics Corporation, Glenview, Ill.

[21] Appl. No.: 580,049

[22] Filed: Feb. 14, 1984

[51] Int. Cl.[4] .............................................. H04N 3/24
[52] U.S. Cl. ..................................... 358/165; 358/184
[58] Field of Search ............... 358/165, 184; 455/230, 455/231, 221, 225, 212, 194; 381/4, 28

[56] References Cited

U.S. PATENT DOCUMENTS 4,398,060 8/1983 Ienaka et al. ......................... 455/194

Primary Examiner—Tommy P. Chin
Assistant Examiner—David E. Harvey

[57] ABSTRACT

A television receiver includes an integrated circuit audio amplifier for having an inverting terminal, a noninverting terminal and an output terminal connected through a feedback resistor back to the inverting terminal. A first capacitor is coupled to the noninverting terminal and a second capacitor is coupled to the inverting terminal. A voltage divider normally establishes the first capacitor at a given potential. A source of regulated potential less than the given potential is coupled through a pair of series connected diodes to the first capacitor and through a single diode to the second capacitor, thus establishing two separate charging paths for said capacitors with the initial time constant of the path coupled to the noninverting terminal being longer than the initial time constant of the path coupled to the inverting terminal.

5 Claims, 2 Drawing Figures

TELEVISION SOUND MUTE CIRCUIT

BACKGROUND OF THE INVENTION AND PRIOR ART

This invention relates in general to audio turn-on circuits and in particular to such circuits used in connection with integrated circuit audio amplifiers in television receivers.

The trend in television (TV) receiver audio systems is toward greater power and higher sound quality. There is also a strong movement to use integrated circuits where possible in TV receivers to obtain the benefits of standardization, reliability, compactness and reduced cost. In addition to an output terminal, most integrated circuit amplifiers include a so-called inverting terminal and a noninverting terminal. These terminals correspond generally to a signal input (noninverting) terminal and a feedback input (inverting) terminal, with the output terminal being connected by a feedback circuit to the inverting terminal.

Difficulties arise in the environment of a TV receiver, where there is a great deal of extraneous signal energy present that needs to be filtered and decoupled from the audio system. Upon turn-on of the TV receiver, the audio amplifier becomes operational too rapidly and amplifies any signals at its input which may include a great deal of noise, since the TV receiver reaches stable operating conditions much more slowly. The audio circuit may also come on with a very noticeable "pop" or click despite the absence of noise at its input, because of rapid transitions in output potential resulting from fluctuation of the potentials at its inverting terminal and its noninverting terminal. Either one of these conditions can be objectionable to a listener.

There are a number of solutions to the problem, the obvious one of which is to use large filter capacitors across the input terminals of the amplifier to force a very slow turn-on and to assure that the two input terminals do not experience abrupt potential changes with respect to each other. Unfortunately, slow turn on is not an acceptable solution since the user expects the audio system to come on within a reasonably short time after turn-on of the TV receiver. Other circuits that do not require unacceptably long turn-on times have been used. In general they are quite elaborate and involve a number of transistors or diodes, in addition to resistors and capacitors for essentially holding the amplifier cut-off during turn-on of the TV receiver and gradually enabling it to reach operating potential. These circuits are costly and difficult to control in large scale manufacture and still impose substantial delays in audio turn-on. In some circuits the operating potentials and charging time constant for the filter coupled to the input terminal of the amplifier have been adjusted to the point where the sound quality has been compromised. There is thus a need in the art for a low cost audio turn-on circuit that avoids these problems.

OBJECTS OF THE INVENTION

The principal object of this invention is to provide a novel audio turn-on circuit.

Another object of this invention is to provide a novel audio turn-on circuit for a television receiver that avoids the problems of the prior art.

A further object of this invention is to provide an audio turn-on circuit which does not compromise the quality of sound from the audio system.

A still further object of the invention is to provide a low cost audio turn-on system for a television audio amplifier.

SUMMARY OF THE INVENTION

In accordance with the invention, a television receiver includes an audio amplifier having its inverting terminal coupled to a first charging circuit and its noninverting terminal coupled to a second charging circuit, with the first charging circuit having a shorter effective time constant than the second charging circuit. Immediately after turn-on of the television receiver, the potential at the inverting terminal is thus greater than the potential at the noninverting terminal, and keeps the amplifier cut off.

BRIEF DESCRIPTION OF THE DRAWINGS

These and other objects of the invention will become apparent upon reading the following description in conjunction with the drawings in which:

FIG. 2 is an idealized graph showing certain voltages during the critical periods after turn-on.

DESCRIPTION OF THE PREFERRED EMBODIMENT

Figure 1:
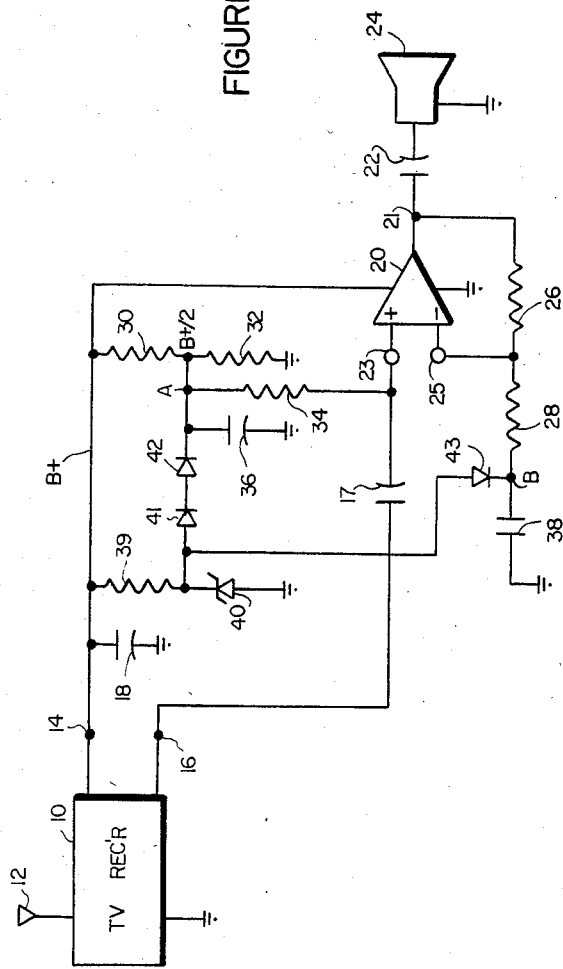
FIG. 1 represents a combined block and schematic diagram of a television receiver incorporating an audio amplifier with a turn-on circuit constructed in accordance with the invention.

A TV receiver 10 includes an antenna 12 for receiving transmitted television signals. The received signals are demodulated and the appropriate audio, video and synchronizing information is recovered therefrom in the receiver. The TV receiver includes two terminals 14 and 16. Terminal 14 represents a source of B+ potential developed in the TV receiver that is supplied to a filter capacitor 18 for removing extraneous signals and noise from the B+ line supplying the audio circuit. B+ potential is supplied to an appropriate terminal on an audio amplifier 20 that is preferably of integrated circuit construction including a positive, noninverting input terminal 23 and a negative, inverting input terminal 25. Amplifier 20 has an output terminal 21 coupled, through a suitable coupling capacitor 22, to a speaker 24. A feedback resistor 26 connects output terminal 21 back to inverting terminal 25, all in a conventional manner.

Terminal 16 supplies audio signal information developed in TV receiver 10 through a coupling capacitor 17 to positive input terminal 23 of amplifier 20. Terminal 23 is also connected through a series connection of a resistor 34 and a capacitor 36, to ground. Similarly terminal 25 is connected through a series connection of a resistor 28 and a capacitor 38, to ground. The ungrounded terminals of capacitors 36 and 38 are labelled A and B, respectively. Point A is connected to the approximate center of a voltage divider connected between B+ and ground. The divider consists of two series-connected resistors 30 and 32 and the normal operating potential at their junction is approximately B+/2, as indicated on the drawing.

The circuit as thus described is in all respects conventional. It will exhibit an audible "pop" upon turn-on of the TV receiver power supply and will also amplify any noise from the TV receiver that appears at terminal 16 unless some form of protection circuit is added.

Amplifier 20 is also conventional and amplifies based upon a difference in potential between its terminals 23 and 25. Its output voltage at terminal 21 is a function of this difference in input terminal potentials with the feedback circuit functioning to stabilize the amplifier under operating conditions. The reason for the amplifier pop after turn-on is a rapid transition that occurs in the voltages at its input terminals. For example, when the TV receiver is switched on, the B+ potential requires a finite time to achieve its normal operating level. Amplifier 20 begins to amplify as the B+ potential rises since its noninverting terminal 23 becomes positive more quickly than its inverting terminal 25 which is delayed until the output of amplifier 20 charges capacitor 38. Thus the amplifier will translate any signal or noise appearing at terminal 16 of the TV receiver. In addition, if the voltage differences between terminals 23 and 25 is great enough, the output of the amplifier will be driven to B+ potential, resulting in high hum levels. Any such signals, hum or noise will be reproduced by speaker 24. As the amplifier input voltage difference increases with terminal 23 becoming much more positive, the output voltage increases and charges capacitor 38 very rapidly. Depending upon the charging rates of the circuitry connected to the two input terminals, the rate of change in voltage between the input terminals may be such to produce a very loud annoying pop in the amplifier output. Since the amplifier is active, signal or noise inputs of magnitude can result in multiple rapid changes in the output terminal potential and turn the amplifier on and off. This of course is very disconnecting and objectionable.

The inventive circuit compensates for these effects by keeping the amplifier cut off during a "stabilization" period, during which period unusual noisy signals may be generated in various non-audio circuits of the TV receiver, and by controlling the relationship between the input terminal potentials. The TV receiver noisy signals, in part, are due to the various tuning circuits in the receiver trying to lock to a signal. For example, while the receiver AFC circuit is trying to lock to a signal, the 4.5 MHz FM sound detector may experience substantial changes in voltage and polarity because the frequency is changing. With the invention, the noninverting terminal 23 of amplifier 20 is forced to be less positive than the inverting terminal 25 to keep the amplifier cut off and to thus preclude any noise from the TV receiver from being amplified and passed to the speaker. Further, the amplifier turn on is controlled by the respective voltage change rates at the two input terminals to prevent a too rapid transition which could produce an audible pop from the speaker. This is accomplished by controlling the charging rates of capacitors 36 and 38.

A source of regulated DC potential, less than B+/2, is developed by a circuit consisting of a resistor 39 connected in series with a zener diode 40. The junction of the resistor and zener diode is coupled through appropriately poled conventional diodes to capacitors 36 and 38, respectively. There are two serially connected diodes 41 and 42 in the charge path to capacitor 36, whereas there is a single diode 43 in the charge path to capacitor 38. The inclusion of the additional diode in the charging path for capacitor 36, which controls the potential on terminal 23, assures that with normal production tolerances and variations in operating conditions, the voltage at the noninverting terminal is always less than the voltage at the inverting terminal during the short but critical time period immediately following turn-on of the TV receiver.

Figure 2:
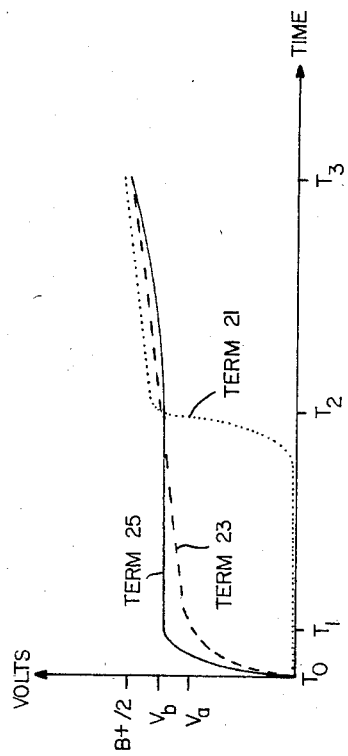

For the purpose of description, as seen in the idealized graphical representation in FIG. 2, three time periods are designated as ending at times T1 and T2 and T3 after turn-on, indicated as T0. From T0 to T1, the potential at point A is held below that of point B because of the diodes connected in the charge paths of capacitors 36 and 38, as mentioned. Between T1 and T2, the B+ supply of the TV receiver comes on fully and the potential at the junction of resistors 30 and 32, to which capacitor 36 (point A) is connected, rises until it achieves a potential greater than that which existed at point A as a result of charging through diodes 41 and 42. The charging current flow through diodes 41 and 42 thus stops and capacitor 36 continues charging from B+/2 from the voltage divider, as in a conventional circuit. Capacitor 38 (point B), which is connected to inverting terminal 25 is initially charged at a rapid rate through diode 43 such that point A potential is always below Point B potential during the critical period T0-T1. Amplifier 20 is thus cut off and no noise is translated therethrough. Further, as is well known, the output potential of amplifier 20 is clamped to ground until the voltage at terminal 23 becomes nearly as positive as that at terminal 25. This occurs by the end of period T2, whereupon the amplifier is turned on and the feedback voltage from output 21 begins to further charge capacitor 38 through resistor 26. The transition of voltages at the inputs of the amplifier is caused to occur gradually and by time T3, circuit operation is normal.

Thus from turn-on time T0 to time T1, inverting terminal 25 is always more positive than noninverting terminal 23 and the amplifier is cut off. Between T1 and T2 the amplitude of input signal necessary for amplification is gradually decreased until at T2 a transition in input terminal voltages occurs. The transition is sufficiently gradual that no audible pop or click is produced in the speaker. The rising feedback voltage now raises the potential of inverting terminal 25 which gradually rises normally to follow that of terminal 23. In practice, the effective time constant during the period T0-T1 for the charging circuit coupled to terminal 23 is about 68 milliseconds whereas the effective time constant during this period for the charging circuit coupled to terminal 25 is about 33 milliseconds. These different charging time constants would normally assure that the terminal 25 voltage will be ahead of the terminal 23 voltage. However, the inclusion of the additional diode in the terminal 23 path assures this relationship during the initial critical period after turn on. Once the voltages on the capacitors exceed that from the regulated source supplying diodes 41–43, the diodes are effectively removed from the circuit.

What has been described is a novel circuit for turning on an amplifier used in conjunction with a TV receiver which economically and effectively precludes noises and pops from being transmitted to the speaker during the critical turn-on period. It is recognized that numerous changes and modifications in the described embodiment of the invention will be apparent to those skilled in the art without departing from the true spirit and scope thereof. The invention is to be limited only as defined in the claims.

What is claimed is:

1. A turn-on circuit for an amplifier in a television receiver, said amplifier having an inverting input terminal, a noninverting input terminal and an output terminal, with the output terminal being coupled via a feedback circuit to the inverting input terminal, and an operating terminal connected to a source of B+ potential, comprising:
- a voltage divider connected to said source of B+ potential, said voltage divider having a junction coupled to said noninverting input terminal;
- a first charging circuit coupled to said inverting input terminal;
- a second charging circuit coupled to said noninverting input terminal, said second charging circuit including a first filter capacitor coupled to said junction;
- said first charging circuit having a shorter effective time constant than said second charging circuit, whereby said inverting input terminal is maintained at a greater potential than said noninverting input terminal for a time immediately after energization of said amplifier.

2. The circuit of claim 1 wherein said amplifier includes a second filter capacitor coupled to said inverting input terminal and in said feedback circuit and wherein said second filter capacitor is included in said first charging circuit.

3. The circuit of claim 2 wherein there is further included a second source of potential lower than the potential at the junction of said voltage divider; and first and second diode means coupled between said second source of potential and said first and second filter capacitors, respectively.

4. The circuit of claim 4 wherein said second diode means includes two or more series connected diodes and said first diode means includes a number of diodes less than the second diode means.

5. In combination that a television receiver including an audio amplifier having an inverting input terminal a noninverting input terminal and an output terminal coupled through a feedback resistor back to the inverting input terminal, a turn-on circuit for said amplifier comprising;
- means coupling said noninverting input terminal to a first potential, said means including a first capacitor and a voltage divider, said voltage divider establishing a second potential;
- means coupling said inverting input terminal to a second capacitor;
- means establishing a third potential less than said second potential supplied from said voltage divider;
- means, including at least a pair of serially connected diodes connected between said establishing means and said first capacitor, forming a first charging circuit including said first capacitor;
- means, including a single diode connected between said establishing means and said second capacitor, forming a second charging circuit including said second capacitor; and
- said second charging circuit having an effective time constant shorter than the effective time constant of said first charging circuit whereby said inverting input terminal is maintained at a greater potential than said noninverting input terminal for a time period immediately after turn-on of power to said television receiver.

* * * * *

UNITED STATES PATENT AND TRADEMARK OFFICE
CERTIFICATE OF CORRECTION

PATENT NO. :   4,600,947
DATED      :   July 15, 1986
INVENTOR(S) :  Chamberlain et al It is certified that error appears in the above-identified patent and that said Letters Patent is hereby corrected as shown below:

In claim 4, line 1, delete "4" and substitute therefor --3--.

Signed and Sealed this

Fourteenth Day of October, 1986

[SEAL]

*Attest:*

DONALD J. QUIGG

*Attesting Officer*   *Commissioner of Patents and Trademarks*